United States Patent
Hosn et al.

(10) Patent No.: US 10,303,772 B2
(45) Date of Patent: May 28, 2019

(54) MEASURING MUTUAL UNDERSTANDING IN HUMAN-COMPUTER CONVERSATION

(71) Applicant: INTERNATIONAL BUSINESS MACHINES CORPORATION, Armonk, NY (US)

(72) Inventors: Rafah A. Hosn, New York, NY (US); Robert J. Moore, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 274 days.

(21) Appl. No.: 15/223,508

(22) Filed: Jul. 29, 2016

(65) Prior Publication Data

US 2018/0032504 A1 Feb. 1, 2018

(51) Int. Cl.
*G06F 17/27* (2006.01)

(52) U.S. Cl.
CPC ........ *G06F 17/279* (2013.01); *G06F 17/2775* (2013.01)

(58) Field of Classification Search
None
See application file for complete search history.

(56) References Cited

U.S. PATENT DOCUMENTS

| | | | |
|---|---|---|---|
| 7,783,486 | B2 | 8/2010 | Rosser et al. |
| 9,817,817 | B2 * | 11/2017 | Hosn ................ G06F 17/218 |
| 2003/0028498 | A1 | 2/2003 | Hayes-Roth |
| 2018/0032881 | A1 * | 2/2018 | Hosn ................ G06N 5/025 |
| 2018/0052821 | A1 * | 2/2018 | Hosn ................ G06F 17/218 |

OTHER PUBLICATIONS

Authors et. al., "Linguistic Analysis of Natural Language Communication with Computers," IP.com No. 000127944, Dec. 31, 1986, pp. 1-21.
Authors et. al., "Observation Research in User-Computer Interaction," IP.com No. 000150817, Dec. 30, 1899, pp. 1-35.
Bohus et al., "Olympus," Feb. 12, 2015, pp. 1-3.
Danilava et al., "Towards Computational Models for a Long-Term Interaction with an Artificial Conversational Companion," AN-13534703, Danilava et al., 2013, pp. 1-7.
Ferri et al., "Multimodal Sentence Similarity in Human-Computer Interaction Systems," AN-9750606, 2007, pp. 1-8.
Olympus, "RavenClaw," Nov. 9, 2011, pp. 1-2.
Zhou et al., "A Semantic Approach to the Dynamic Design of Interaction Controls in Conversation Systems," AN-7553998, 2002, pp. 1-16.
List of IBM Patents or Patent Applications Treated as Related; (Appendix P), Filed Jun. 15, 2017; 2 pages.
Rafah A. Hosn et al. "Measuring Mutual Understanding in Human-Computer Conversation", U.S. Appl. No. 15/223,485, filed Jul. 29, 2016.

* cited by examiner

*Primary Examiner* — Satwant K Singh
(74) *Attorney, Agent, or Firm* — Cantour Colburn LLP; Feb Roman Cabrasawan

(57) ABSTRACT

Technical solutions are described method for analyzing a natural language conversation-generating machine. An example computer implemented method includes determining, from a plurality of adjacency pairs in a conversation, a number of base pairs. The computer implemented method also includes determining, from the plurality of adjacency pairs, a number of expansion pairs. The computer implemented method also includes computing a efficiency score for the conversation by computing a ratio of the number of base pairs and the number of expansion pairs.

17 Claims, 11 Drawing Sheets

| Turn | Speaker | 1st position I mean... | 2nd position Do you mean? | 3rd position No, I mean... | 4th position Oh, you mean... |
|---|---|---|---|---|---|
| T1 | A | 1PPa | | | |
| T2 | B | 2PPa | 2PR (T1) | | |
| T3 | A | 1PPb | 2PR (T2) | 3PR (T1) | |
| T4 | B | 2PPb | 2PR (T3) | 3PR (T2) | 4PR (T1) |
| T5 | A | 1PPc | 2PR (T4) | 3PR (T3) | 4PR (T2) |
| T6 | B | 2PPc | 2PR (T5) | 3PR (T4) | 4PR (T3, T1) |

Fig. 3

Labeling Scheme 40

| | |
|---|---|
| OTHER | Not part of an adjacency pair |
| B1PP | Base First-Pair Part |
| B2PP | Base Second-Pair Part |
| SC3 | Sequence-Closing Third |
| PR1PP | Pre-Expansion First-Pair Part |
| PR2PP | Pre-Expansion Second-Pair Part |
| IN1PP | Insert Expansion First-Pair Part |
| IN2PP | Insert Expansion Second-Pair Part |
| IN1PP-2PR | Insert Expansion First-Pair Part 2nd-Position Repair Initiator |
| IN2PP-2PR | Insert Expansion Second-Pair Part 2nd-Position Repair |
| PO1PP | Post-Expansion First-Pair Part |
| PO2PP | Post-Expansion Second-Pair Part |
| PO1PP-2PR | Post-Expansion First-Pair Part 2nd-Position Repair Initiator |
| PO2PP-2PR | Post-Expansion Second-Pair Part 2nd-Position Repair |
| PO1PP-3PR | Post-Expansion First-Pair Part 3rd-Position Repair Initiator |
| PO2PP-3PR | Post-Expansion Second-Pair Part 3rd-Position Repair |
| PO1PP-4PR | Post-Expansion First-Pair Part 4th-Position Repair Initiator |
| PO2PP-4PR | Post-Expansion Second-Pair Part 4th-Position Repair |

Labels 405    Adjacency Pair Positions 410

Fig. 4

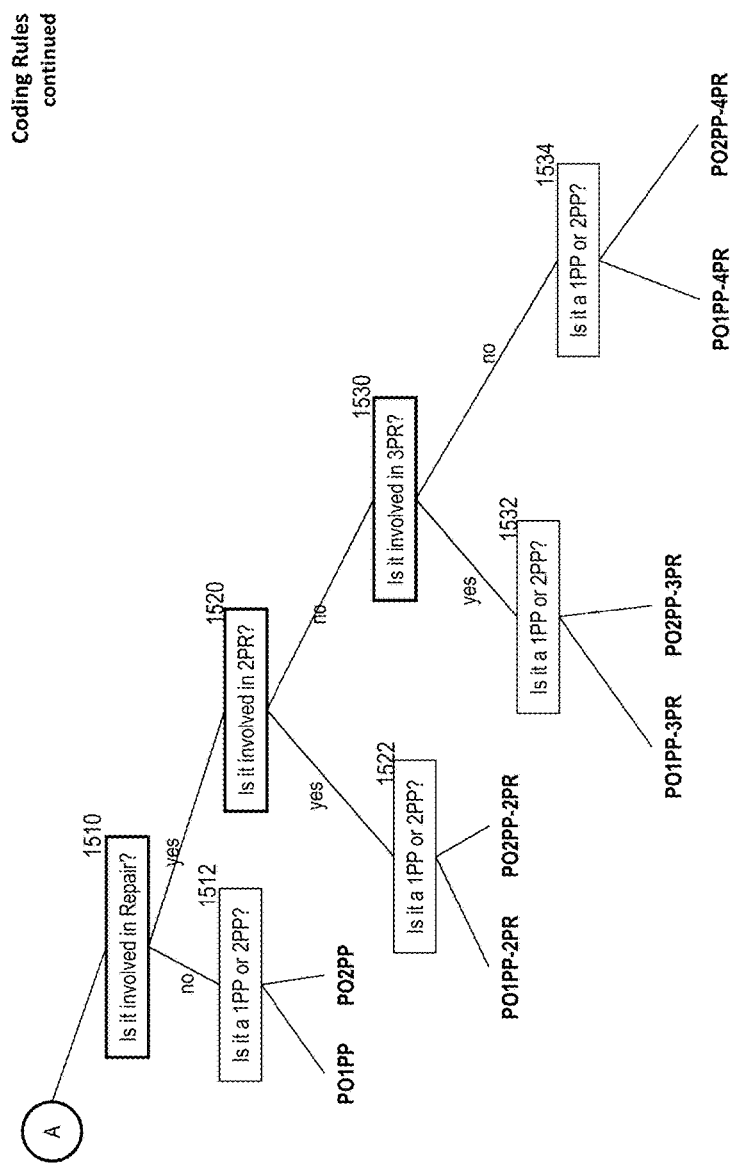

Hi, my name is Watson. What's your name?~GREETING|IDENTIFICATION~B1PP;XXX
How can I help you?~INITIAL_OFFER-OF-SERVICE~B1PP
Hi~GREETING~B1PP
Hi, how are you today?~GREETING~HOWAREYOU~B2PP~B1PP
i'm good.~NEUTRAL_ASSESSMENT~B2PP
That's good.~POSITIVE_ASSESSMENT~SC3
How can I help you?~INITIAL_OFFER-OF-SERVICE~B1PP
what can you do?~INQUIRY_CAPABILITY_CHECK~PR1PP
I can give you the names, locations and hours of places in the hotel and nearby.~ANSWER_CAPABILITIES~PR2PP
ok do you have a restaurant~INQUIRY_PLACE_CHECK~PR1PP
ok do you have a restaurant in the hotel~PLACE_CHECK~PR1PP
Yes.~CONFIRMATION~PR2PP
Vista Grill.~OFFER~XXX
where is it~INQUIRY_LOCATION~B1PP
Vista Grill is located on the 3rd floor by the elevators.~ANSWER_LOCATION~B2PP
when does it close~INQUIRY_HOURS~B1PP
Vista Grill is open 5:00pm-11:00pm.~ANSWER_HOURS~B2PP
thanks~APPRECIATION~PO1PP
You're welcome.~YOUREWELCOME~PO2PP
Is there anything else I can do for you?~SUBSEQUENT_OFFER-OF-SERVICE~B1PP
know any jokes~REQUEST_JOKE~B1PP
What did the Buddhist say to the hot dog vendor?~GRANT_JOKE~B2PP/B1PP
i don't know~ABORT_SEQUENCE~B2PP
Make me One with everything.~PUNCHLINE~SC3
haha~ACKNOWLEDGMENT~SC3
Is there anything else I can do for you?~SUBSEQUENT_OFFER-OF-SERVICE~B1PP
no~DECLINATION~B2PP
Okay.~ACKNOWLEDGMENT~SC3
Did you find what you were looking for?~INQUIRY~PR1PP
yes~CONFIRMATION~PR2PP
Excellent!~POSITIVE_ASSESSMENT~SC3
Goodbye.~CLOSING~B1PP
bye~CLOSING~B2PP Format = Speaker~"Utterance"~Dialogue-Act~Adjacency-Pair-Position~Repair-Position

Fig. 8

MEASURING MUTUAL UNDERSTANDING IN HUMAN-COMPUTER CONVERSATION

BACKGROUND

The present application relates to design of natural conversational systems and methods for measuring levels of mutual understanding between user and system.

A conversation system is a machine, such as a computer system that engages in a natural language conversation, typically with a human user. Typically, in conversational systems, dialog designers use a dialog scripting language (for example, VoiceXML) to encode a conversation between the user and the machine. While the goals of these scripting language are to help a dialog designer to create an engaging, robust end user interaction, the scripting language do so indirectly because the dialog designer has to ensure that the "script" he/she creates is valid and conforms to the programming model of the machine.

For the machine to have the natural language conversation with a human user, text analytic techniques, and conversational systems, the machine has to detect social actions the user is performing in order to determine user intent and to respond appropriately. Current solutions typically label utterances in conversational data in terms of their "dialogue acts" and use these labels to train statistical classifiers. Alternatively, some solutions (such as Dialog Act Markup in Several Layers (DAMSL)) label utterances in terms of whether they are repairs on previous or "antecedent" turns.

SUMMARY

According to one or more embodiments, a computer implemented method for analyzing a natural language conversation-generating machine includes determining, from a plurality of adjacency pairs in a conversation, a number of base pairs. The computer implemented method also includes determining, from the plurality of adjacency pairs, a number of expansion pairs. The computer implemented method also includes computing a efficiency score for the conversation by computing a ratio of the number of base pairs and the number of expansion pairs.

According to one or more embodiments, a system for analyzing a natural language conversation-generating machine includes a memory, and a processor coupled with the memory. The processor determines, from a plurality of adjacency pairs in a conversation, a number of base pairs. The processor also determines, from the plurality of adjacency pairs, a number of expansion pairs. The processor also computes a efficiency score for the conversation by computing a ratio of the number of base pairs and the number of expansion pairs.

According to one or more embodiments, a computer program product for analyzing a natural language conversation-generating machine includes a computer readable storage medium, which includes computer executable instructions. The computer readable storage medium includes instructions to determine, from a plurality of adjacency pairs in a conversation, a number of base pairs. The computer program product also includes instructions to determine, from the plurality of adjacency pairs, a number of expansion pairs. The computer program product also includes instructions to compute a efficiency score for the conversation by computing a ratio of the number of base pairs and the number of expansion pairs.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

FIG. 3 illustrates an example with four structural positions from which repair can be initiated on a problematic turn and example labels according to one or more embodiments.

FIG. 4 illustrates an example labeling scheme according to one or more embodiments.

FIG. 7 illustrates a flowchart for identifying an adjacency pair position of the utterance and determining the structural label of the adjacency pair position according to one or more embodiments.

FIG. 8 illustrates a result of an example execution of a labeling method according to one or more embodiments.

DETAILED DESCRIPTION

Disclosed here are technical solutions for analyzing a machine that generates a natural language conversation. The technical solutions further facilitate improving the natural language conversation generated by the machine. As such the technical solutions are rooted in and/or tied to computer technology in order to overcome a problem specifically arising in the realm of computers, specifically natural language conversation generation.

The technical solutions facilitate improving natural language conversation generation techniques by analyzing a natural language conversation (hereinafter conversation) based on contextual data about conversational actions' sequential and repair positions. Conversational actions may be utterances that make up the conversation. The techniques facilitate an automatic and dynamic labeling of utterances in the conversation. In one or more examples, the automatic labelling is performed as the utterances occur during an ongoing conversation using a labeling scheme. The labeling scheme classifies the utterances in terms of the utterances' positions in adjacency pair expansion, if any, and their repair position, if any. The labeling scheme simplifies the classification of the utterances and thus training the machine using the labeling since the labeling scheme does not label utterances in terms of dialogue acts of which there are many and which are possibly open-ended. For example, dialogue acts may include, "request," "offer," "promise," "insult," and many more. Instead, the labeling scheme provided by the technical solutions described herein provides a fixed set of codes that is predetermined, such as a fixed set of 18 codes. When combined with text analysis of the words of the utterance, the positional labels facilitate providing statistical classifiers contextual information about the utterance's relationships to previous utterances, which improves classifier performance.

In exemplary embodiments, the utterance labels can be attached to conversational data through a rule-based dialog system. However, it will be obvious to a person skilled in the art that technical solutions described herein are readily applicable to automatically label a transcript of the conversation that may be accessed or received. Using the rule-based system, the utterance labels are attached to input and output nodes in a dialog system (such as IBM's Watson Dialog Service™). For example, the user, such as a human, interacts with the machine that executes the dialog system, and the dialog system automatically labels the natural text strings using the labeling scheme. Thus, the rule-based system generates labeled data that a statistical classifier uses for training.

Figure 1:
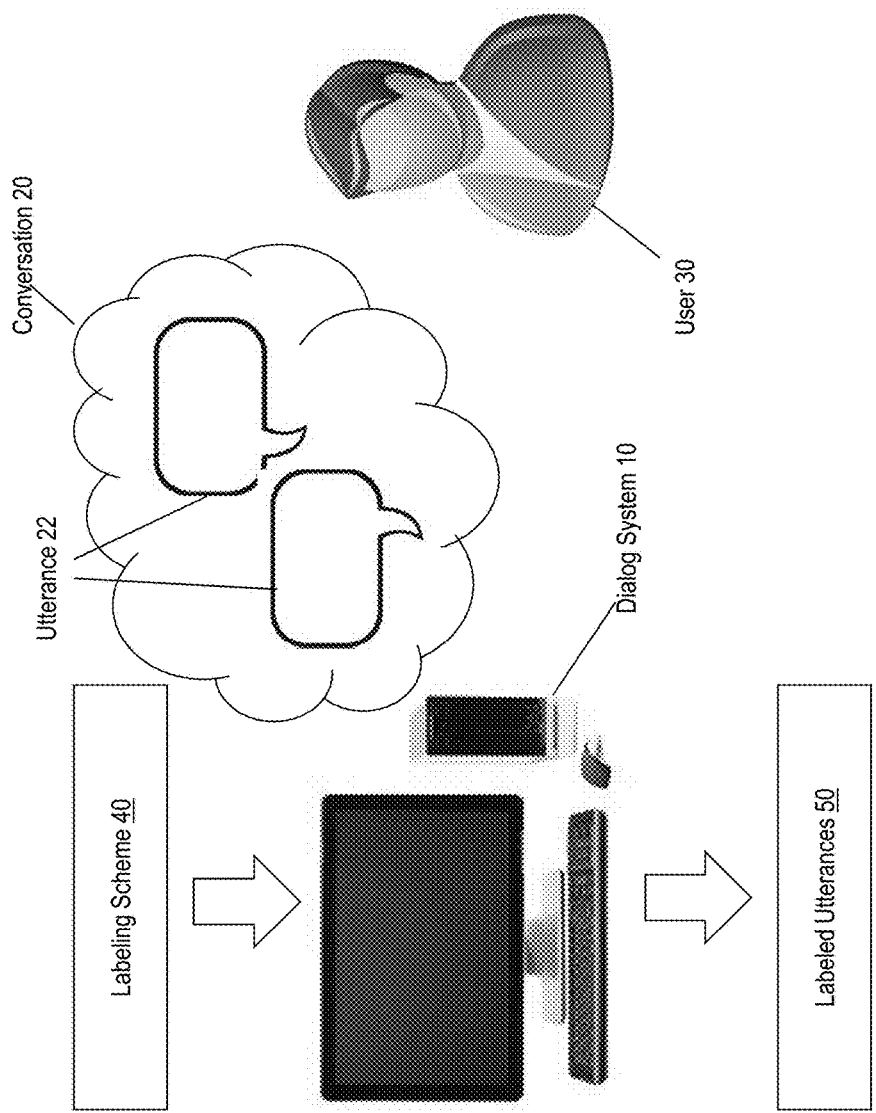
FIG. 1 illustrates an example system for automatic detection and labeling of conversational actions according to one or more embodiments.

FIG. 1 illustrates an example system for automatic detection and labeling of conversational actions. The system includes a dialog system 10 that analyzes a conversation 20 between the dialog system 10 and a user 30. The conversation 20 includes at least one utterance 22, which may be any participant in the conversation 20. The dialog system 10 receives and analyzes each utterance 22 of the conversation as the utterance 22 occurs during the ongoing conversation 20. The dialog system 10 determines a label for the utterance 22, based on a labeling scheme 40. The dialog system 10 records labeled utterances 50, which the statistical classifier uses for training, for example, for training a machine for natural language conversations.

Figure 2:
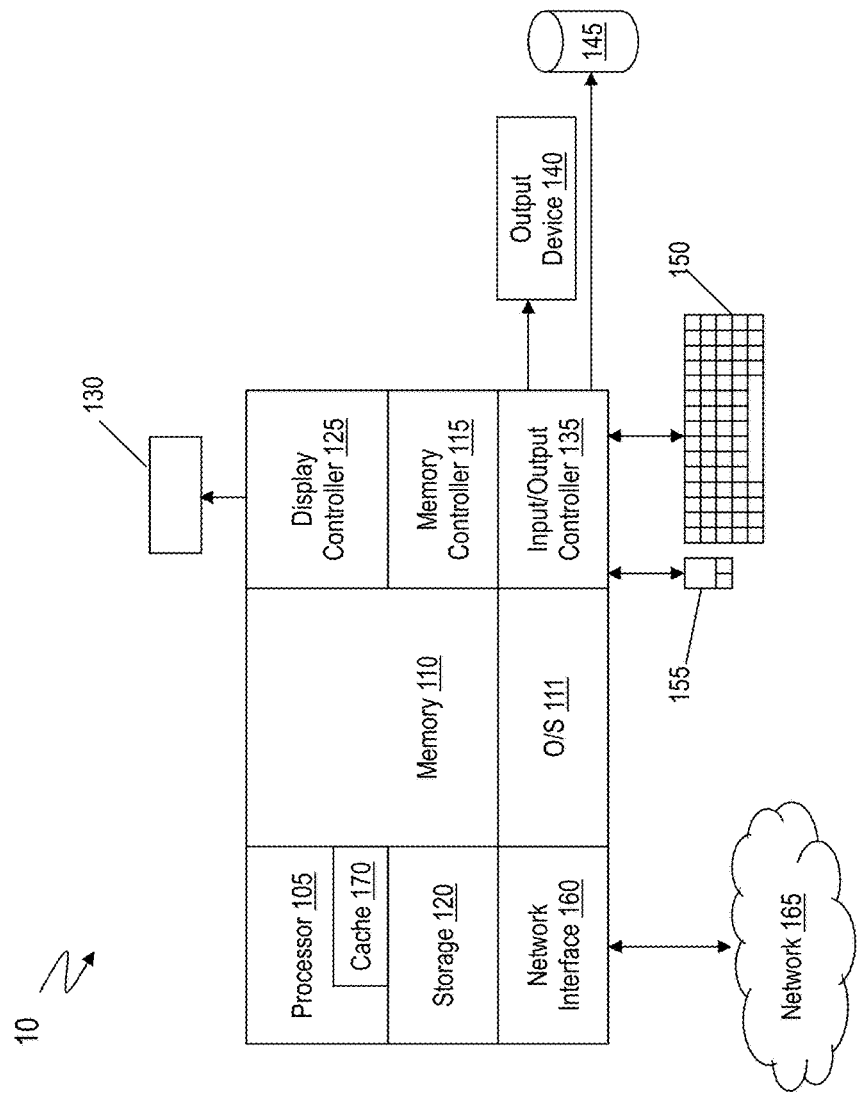
FIG. 2 illustrates an example dialog system according to one or more embodiments.

FIG. 2 illustrates an example dialog system. The dialog system 10 may be a communication apparatus, such as a computer. For example, the dialog system 10 may be a desktop computer, a tablet computer, a laptop computer, a phone, such as a smartphone, a server computer, or any other device. The dialog system 10 may communicate via a network 165. The dialog system 10 includes hardware, such as electronic circuitry.

The dialog system 10 includes, among other components, a processor 105, memory 110 coupled to a memory controller 115, and one or more input devices 145 and/or output devices 140, such as peripheral or control devices, that are communicatively coupled via a local I/O controller 135. These devices 140 and 145 may include, for example, battery sensors, position sensors, indicator/identification lights and the like. Input devices such as a conventional keyboard 150 and mouse 155 may be coupled to the I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor among several processors associated with the dialog system 10, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, and so on).

The memory 110 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 2, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The dialog system 10 may further include a display controller 125 coupled to a user interface or display 130. In some embodiments, the display 130 may be an LCD screen. In other embodiments, the display 130 may include a plurality of LED status lights. In some embodiments, the dialog system 10 may further include a network interface 160 for coupling to a network 165. The network 165 may be an IP-based network for communication between the dialog system 10 and an external server, client and the like via a broadband connection. In an embodiment, the network 165 may be a satellite network. The network 165 transmits and receives data between the dialog system 10 and external systems. In some embodiments, the network 165 may be a managed IP network administered by a service provider. The network 165 may be implemented in a wireless fashion, for example, using wireless protocols and technologies, such as WiFi, WiMax, satellite, or any other. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

In an example, the dialog system 10 accesses the labeling scheme 40 that may be stored in the memory 110 or the storage 120. Alternatively or in addition, the dialog system 10 accesses the labeling scheme 40 from a remote location via the network 165. The dialog system 10 labels the utterance 22 that is part of the conversation 20 using the labeling scheme 40. The labeling scheme 40 is a set of predetermined labels 405 corresponding to respective adjacency pair positions 410.

An adjacency pair is a type of conversational sequence of utterances. The dialog system 10 identifies an adjacency pair from the conversation 20 based on predetermined characteristics. For example, the dialog system 10 identifies a sequence of two utterances, which are produced by different speakers, ordered as a first-pair part (1PP) and second-pair part (2PP), where a first pair part requires a particular second pair part (or range of second parts). In addition, the utterances in the adjacency pair may be adjacent to each other. The following are some examples of adjacency pair sequences: greeting-greeting, goodbye-goodbye, informing-acknowledgment or assessment-assessment. In some examples, adjacency pairs have binary response options, such as request-granting|rejection, inquiry-answer|refusal, invitation-acceptance|declination, offer-acceptance|rejection or complaint-excuse|remedy.

For example, upon the uttering of a request, such as, "Could you please pour me a coffee too?", whatever the recipient does next may be interpreted as a grant, for example, "Sure!," or a rejection, for example, "There's no more left." In this example, the request is the first-pair part (1PP), which proposes that a particular type of second-pair part (2PP), a granting or rejection, may come next and thereby creates the expectation that the recipient owes such a response. In an example, an adjacency pair is defined in terms of a social action the adjacency pair accomplishes, not the grammatical structure of the conversation or the utterances. For example, a request, like many other first-pair parts, may be accomplished with an interrogative form, "Could you please pour me a coffee too?" with a declarative, "I want a coffee too, please!" or with an imperative, "Please pour me a coffee too."

Some additional examples adjacency pairs are illustrated in Table 1.

TABLE 1

Greeting-greeting
1PP: Hello.
2PP: Hi.
Informing-acknowledgment
1PP: You dropped something.
2PP: Oh, thank you.
Offer-acceptance|declination
In this pair, 2PP either accepts or declines the offer made in 1PP, as shown in the following example:
1PP: Do you want a free milkshake?
2PP: Yes, please.
Invitation-acceptance|declination
In this pair, 2PP either accepts or declines the invitation from 1PP, as shown in the following example:
1PP: Want to go out?
2PP: Sure.
Note: some adjacency pairs have binary response options, such as granting|rejection or acceptance|declination.

The adjacency pair cases illustrated so far occur with only two turns: the first-pair part and the second-pair part. In other examples, adjacency pairs can be expanded to arbitrary lengths using additional adjacency pairs. Such expansions make natural conversations powerful and versatile. For example, an adjacency pair model may include three structural positions for expansion with respect to a base adjacency pair: pre-expansion, insert expansion, and post-expansion.

Thus, the dialog system 10 identifies different types of adjacency pairs. A base adjacency pair is a sequence of two turns, such as the examples described earlier. Such an adjacency pair is considered a "base" pair because it contains a primary social action being performed. For example, consider an Invitation sequence "A: 1PP: Want to go out?; B: 2PP: Sure." In this base pair, Speaker A extends an invitation with, "Want to go out?" and Speaker B responds with a simple acceptance, "Sure." Invitation and acceptance are the primary social actions being accomplished here.

Additional actions may be performed for the purpose of supporting the primary actions or managing the conversation itself. An adjacency pairs that provides such support may be a post-expansion pair. For example, a base adjacency pair that has binary response options may occur with at least a minimal post-expansion, that is, a third turn initiated by the first speaker. For example, Speaker A in the above example may respond with "A: SC3: Great!".

"Great!" in this position is a sequence-closing third (SC3), or simply a receipt. In this example, it is a signal by Speaker A that the second-pair part was accepted and the sequence is closed. Other examples of SC3 may include "okay," and "thank you" with request sequences. Also, "oh" may be used in informing-acknowledgment sequences to indicate that the information given was news or a surprise to the recipient. Sequence-closing thirds, thus, provide feedback about the adequacy of the second-pair part for the first speaker (in the above example, speaker A). In the context of a conversation with the dialog system 10, such a SC3 response may be feedback from the user that the system's response was acceptable.

Alternatively, instead of a sequence-closing thirds, other post-expansions may consist of an additional adjacency pair. For example, consider conversation "A: 1PP: Want to go out?; B: 2PP: Sure; A: 1PP: Really?; B: 2PP: Of course!". In this case, A topicalizes B's acceptance in the third turn, with "Really?," and elicits a confirmation from her, "Of course!".

In addition to post-expansions, adjacency pairs can also be expanded with pre-expansions. Pre-expansions are adjacency pairs that come just before the base adjacency pair, which is dependent on the pre-expansion pair. For example, "A: 1PP: Are you busy tonight? B: 2PP: Not really; A: 1PP: Want to go out?; B: 2PP: Sure; A: 1PP: Really?; B: 2PP: Of course!" In this example, the first-pair part, "Are you busy tonight?" is a pre-invitation. Such a turn may be interpreted as an unmotivated inquiry, and as part of preliminaries to invitations or requests. Thus, a pre-expansion pair is an expansion of the base pair sequence because depending on the response that the pre-expansion pair elicits, the base pair sequence may or may not be produced. In this case, the second-pair part, "Not really," signals to A that B may be open to an invitation to do something that evening.

A third kind of sequence expansion to the base adjacency pair is an insert expansion. The insert expansion may occur in between the first- and second-pair parts of the base pair sequences. For example, consider the ongoing example, "A: 1PP: Are you busy tonight?; B: 2PP: Not really; A: 1PP: Want to go out?; B: 1PP: Where?; A: 2PP: The sushi place; B: 2PP: Sure; A: 1PP: Really?; B: 2PP: Of course!". In this example, B proposes that her ability produce the base second-pair part, an acceptance or declination, is dependent on A's response to the inserted first-pair part, "Where?". Upon receiving the second-pair part to that question, "The sushi place," B then accepts the invitation. Insert expansions, thus, are used to manage a recipients' dependencies on the base second-pair part, in this case, the acceptance or declination.

Thus, in a typical conversation, common action sequences or adjacencies pairs may be accomplished in three turns, which include a minimal sequence-closing third, or in more than three turns, using expansion pairs. The expansion pairs provide speakers with the ability to manage real-world dependencies.

In addition, expansion pairs may facilitate the speakers to handle interactional troubles faced during the conversation. For example, speakers may expand adjacency pairs in order to initiate a repair on prior turns. 'Repair' is a set of methods for managing troubles in speaking, hearing, or understanding. For example, a repair may be a repeat or an alternative wording of a whole or part of a prior turn. The repair may be initiated or produced by the speaker or by a recipient.

Returning to our earlier example, either speaker may indicate trouble in hearing or understanding a prior turn by the other. For example, consider the conversation, "A: 1PP: Are you busy tonight?; B: 1PP: Busy when?; A: 2PP: Tonight; B: 2PP: Not really; A: 1PP: Want to go out?", which may be followed with other utterances illustrated in other examples. In this case, B initiates a repair on A's pre-invitation with, "Busy when?." Such a repair, for example, may propose a difficulty in hearing the word that A said after the word 'busy' and thereby, elicits a repeat of the word, "Tonight" by A. Thus, in this example, an insertion sequence is done inside of a pre-sequence.

In addition to hearing troubles, repairs may also deal with troubles in understanding. For example, consider a part of the example conversation, "A: 1PP: Want to go out?; B: 1PP: You mean on a date?; A: 2PP: Maybe; B: 1PP: Where?; A: 2PP: The sushi place; B: 2PP: Sure; A: 1PP: Really?; B: 2PP: Of course!". In this example, B responds to the invitation with a request for clarification of the nature of the invitation: "You mean on a date?". This kind of repair deals, not with the particular words that A said, but with what A meant by saying the words. Thus, the repair, in this case, formulates an interpretation of the words for A to confirm or reject. In this example, A gives a weak confirmation with "Maybe."

Since, speakers can experience trouble in hearing or understanding any prior turn, sequence expansions that seek repair can occur anywhere in a conversation. Accordingly, adjacency pairs are infinitely expandable. However, in practice, speakers usually give up after only a couple of attempts at repairing the same turn.

Returning to the invitation example, instead of responding with a clear acceptance, B may respond with something that looks more like a declination. For example, "A: 1PP: Are you busy tonight?; B: 1PP: Busy when?; A: 2PP: Tonight; B: 2PP: Not really; A: 1PP: Want to go out?; B: 1PP: You mean on a date?; A: 2PP: Maybe; B: 1PP: Where?; A: 2PP: The sushi place; B: 2PP: Well, I really need to wash my hair tonight; A: 1PP: Oh, you mean you can't go?; B: 2PP: No, sorry."

Here, after the two insertion sequences, B reports a circumstance, "Well, I really need to wash my hair tonight," which neither explicitly accepts nor declines the invitation. By reporting a competing activity, B implies a declination. In response, A does a sequence-closing third "oh" and initiates a repair on the meaning of the reporting, "you mean you can't go?". This first-pair part projects a confirmation next, which B produces, "No, sorry." Thus, the ability to initiate a repair on the base second-pair part is critical for A and B to achieve mutual understanding. In the dialog system 10, A may be the user and the base second-pair part, the system's answer to the user's inquiry or response to the user's request.

Thus, the expandable adjacency pair model is a set of building blocks with predictable positions. Each position provides one or the other speaker with opportunities for managing dependencies or repairs. As described throughout, a pre-expansion facilitates a speaker to manage dependencies on the base first-pair part. The base first-pair part facilitates the speaker to produce a main action. An insert expansion facilitates a recipient to manage dependencies on the base second-pair part or repairs on the base first-pair part. The base second-pair part facilitates the recipient to produce a response to the main action. Further, a post-expansion facilitate the speaker to manage dependencies or repairs on the base second-pair part or repairs on the base first-pair part.

FIG. 3 illustrates an example with four structural positions from which repair can be initiated on a problematic turn and example labels. In the illustration of FIG. 3, the labels 1PR, 2PR, 3PR, and 4PR represent a "1st-position repair," a "2nd-position repair," a "3rd-position repair" and a "4th-position repair," respectively. In addition, the turn number in parentheses next to each repair turn refers to the turn that is being repaired ("trouble source"). For example, "3PR (T1)" represents a "3rd-position repair on turn 1." When speakers initiate repair from different positions, they tend to use different utterance prefaces, such as, "I mean . . . ", "Do you mean?", "No, I mean . . . ", "Oh, you mean . . . " respectively. Of course, other examples are possible. Labeling the utterances accordingly facilitate providing markers that can help identify particular types of repair.

FIG. 4 illustrates an example labeling scheme 40. The labeling scheme 40 includes labels 405 that identify corresponding adjacency pair positions 410 described herein. The dialog system 10 upon receiving an utterance 22 of the conversation 20, identifies the corresponding adjacency pair position of the utterance in the conversation 20 and accordingly assigns the utterance 22 a corresponding label based on the labeling scheme 40. The labeled utterances 50 include the resulting data, which stores the "Utterance 22+Structural Label." For example, a labeled utterance may be "so you're requesting a card for your son"+PO1PP-2PR. Thus, the technical solutions facilitate generation of the labeled utterances 50, in which each record includes Uttered Words and Structural Label. The labeled utterances 50 is used to train a statistical classifier. Of course, the labeling scheme 40 illustrated in FIG. 3 is just one of several example labeling schemes possible.

Figure 5:
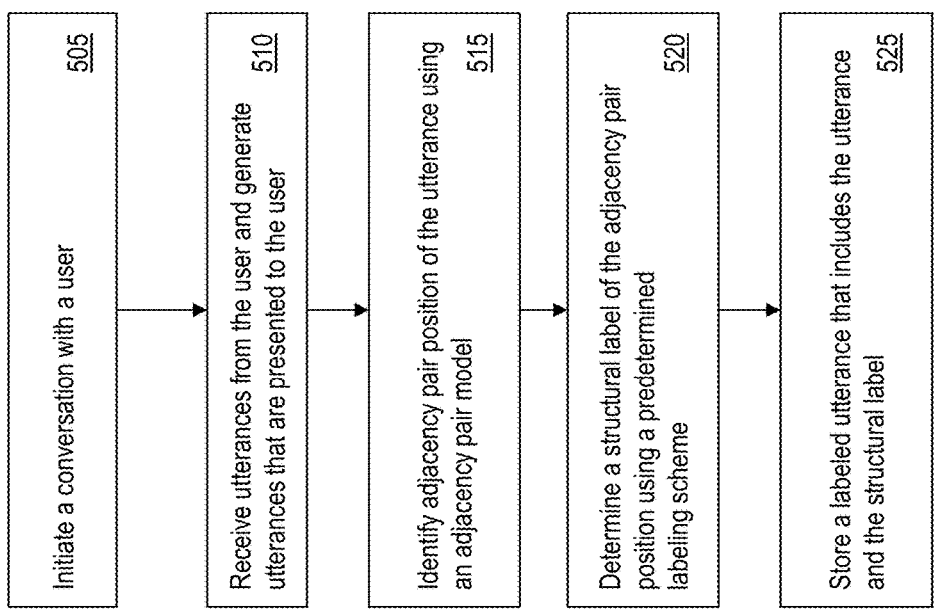
FIG. 5 illustrates an example flowchart of a method for automatic detection and labeling of conversational utterances according to one or more embodiments.

FIG. 5 illustrates an example flowchart of a method for automatic detection and labeling of conversational utterances. In an example, the method may be implemented by the dialog system 10. In another example, the method may be implemented by another computing device, which includes similar hardware components as those in the dialog system 10. For example, the other computing device may use the dialog system 10 to interact with the user 30.

The example method may include initiating the conversation 20 with the user 30, as shown at block 505. For example, in the service encounters domain, the conversation may be initiated by the dialog system 10 generating and outputting a greeting (1PP) combined with an offer-of-service so that the user's service request/problem report (1PP) is elicited in his or her first turn (user is not given a slot to return the greeting). For example, offers-of-service may be "How can I help you?" or "What can I do for you?" or a specific one, "Can I help you find movies?".

The method may further include receiving utterances from the user 30 and generating further utterances that are presented to the user 30, as shown at block 510. In the above example, in response to the initial utterance generated by the dialog system 10, the user's service request may take the form of an explicit request, "What is the address for Almaden?" or an implied request, "I can't find the address for IBM Almaden." In an example, a default search node in the dialog system 10, requests an elaboration or paraphrase of user's service request, "What is the address for Almaden?" by saying, "What do you mean?" and eliciting an alternate version, "What is the address for Almaden?".

Once the opening sequence is complete, the dialog system 10 may generate and receive utterances for pre-expansion sequences. For example, in the illustration related to the ongoing customer-service scenario, a pre-expansion sequence may deal with the user inquiries before making a request. For example, in preparation for asking, "What is the address for Almaden?" the user 30 may first ask, "Do you know about IBM Almaden?" If the response to this preliminary is negative, then the subsequent request may not be made. In a parallel example, in preparation for asking, "Do you want to go out?" the user 30 may first ask, "Are you busy tonight?" and if the response is positive, then the subsequent invitation will not be extended.

In another example, once the initial request is received, the dialog system may generate and receive utterances that are part of an insert expansion sequence. For example, the dialog system 10 may generate routing questions in response to the request from the user 30. The routing questions may deal with system dependencies on the granting. In this case, the request is routed to more than one request sequences in the dialog system 10. For example, the user's request, "What is the address for Almaden?" could be routed to "What is the street address for Almaden?" or "What is the web address for Almaden?" Thus, the routing sequence contains a routing question, "Street address or web address?" designed to elicit a resolution of the system's dependency.

In addition, the dialog system 10 generates and receives utterances of the base adjacency pair sequence, such as request-granting/rejection. In the ongoing example, the base adjacency pair represents the information request, "What is the street address for Almaden?" and the corresponding granting, "IBM Almaden is located at 650 Harry Road, San Jose, California, 95120, USA." In an example, the dialog system 10 generates an insertion sequence associated with the main request sequence that deals with system dependencies on the granting. In this case, the dependency applies only to one request sequence. For example, an insertion sequence for the base adjacency pair is generated to receive user input to clarify the request from the user 30, and upon receipt of the clarification, the dialog system 10 provides the granting, or rejection, of the request based on the clarification. For example, in an earlier example described herein, the dialog system 10 responds to the user's invitation, "Do you want to go out to dinner?" with another request, "You mean on a date?".

Further, the dialog system 10 generates and/or receives post-expansion sequences. For example, the post-expansion sequences may be for the request sequence that immediately follows the granting or rejection and deals with user dependencies on either the response to the request or the request itself. For example, in response to, "IBM Almaden is located at 650 Harry Road, San Jose, California, 95120, USA" the user 30 responds with, "okay" or "thanks." In another example, the post-expansion may include repairs.

The user 30 may request a second-position repair in response to the granting from the dialog system 10. For example, in response to, "IBM Almaden is located at 650 Harry Road, San Jose, California, 95120, USA," the user 30 might do a second-position repairs based on an understanding/hearing check by requesting a confirmation of candidate hearing, "650 Harry Road?" or an interpretation, "in the Bay Area?" of the request response. The dialog system 10, in turn, responds with a simple confirmation, "Yes." Alternatively, the user 30 might do the second-position repairs based on an elaboration request, by requesting an alternative formulation of the request response such as, "What do you mean?". In this case, the dialog system 10 offers an elaboration, "That's the street address. It's about 50 miles south of San Francisco." In yet another example, the user 30 might do the second-position repairs based on a definition request by requesting a definition of a particular term in the request response, such as "What does Almaden mean?". The dialog system 10 may respond with, "Almaden" is the name of an area of south San Jose.

In another example, the dialog system 10 may generate and/or receive post-expansion sequences for third- & fourth-position repairs. For example, in response to, "IBM Almaden is located at 650 Harry Road, San Jose, California, 95120, USA," the user 30 may input a reformulated request. For example, the user 30 paraphrases the original request, such as "No, I mean the address for the one on Bailey Road." In response, the dialog system 10 responds with a result for the reformulated request, for example, "IBM Silicon Valley Lab is located at 555 Bailey Ave., San Jose, California, 95141, USA." Alternatively, the user 30 indicates an incongruent turn, which is a problem in the request that was made, such as "Isn't that on Bailey Road?" In response, the dialog system 10 repairs the result and generates an utterance such as "Oh, you mean the Silicon Valley Lab, not Almaden." Thus, the dialog system 10 generates utterances related to third- & fourth-position repairs, which may in response to an utterance from the user 30 indicating an understanding/hearing check, an elaboration request, a definition request, a reformulated request, an incongruent turn, or any other repair.

When generating an utterance for a repair sequence, the dialog system 10 determines what utterance to generate based on the utterance in the prior turn. For example, if the user 30 requests a full repeat of the prior turn, such as with "What did you say?" or "say again," the dialog system 10 may mark the utterance in the prior turn with, "I said . . . " and repeat the utterance in the prior turn. Alternatively, or in addition, if the user 30 cancels the prior turn, such as with "never mind," the dialog system 10 accepts and redirects the user 30 to the initial operation, such as the offer-of-service, and repeat the opening sequence, such as "How can I help you?". Alternatively, or in addition, if the user 30 requests a definition of a term, such as "What does IBM stand for?" the dialog system 10 provides the definition, in this example, "International Business Machines," and then returns to the previous node. In an example, when returning, the dialog system 10 repeats the utterance in the prior turn.

To detect if a repair sequence is to be generated, the dialog system 10 may detect trigger words or phrases. For example, trigger words such as Okay/oh/thanks in 3rd position is indicative acknowledges response and closes current sequence. Alternatively or in addition, a request for a partial repeat in 3rd position triggers a request for confirmation of partial repeat or interpretation of the prior request. Alternatively or in addition, a user input such as "What did you say?/Say again" in global, that is at any time during the conversation 20 elicits a repeat of the utterance in the prior turn. Instead, a user input such as "What do you mean?" in 3rd position elicits an elaboration of whole the prior request. A user input such as "What does (word) mean/stand for?" in 3rd position or in global elicits a definition of a word or phrase in the prior request. In response to receipt of user input such as "No,/no, I mean (followed by new words)" in 3rd position triggers the dialog system 10 to repair a prior request from the user 30. Further, a user input such as a "Never mind/nevermind/nvm" in global cancels a previous turn, and the dialog system 10 may restart from the opening sequence. Alternatively or additionally, a user input such as "I need to go/gotta go/gtg" in global proposes closing the conversation, and the dialog system 10 ends the conversation 20, without going to the opening sequence again. Thus, the dialog system 10 generates utterances for presenting to the user 30 based on the position of the utterances in the prior turn in an adjacency pair sequence and further upon contents of the utterance received from the user 30.

Additionally, the user 30 may initiate the closing of the conversation 20 at any time. For example, if the user 30 inputs, "I need to go" or "goodbye," the dialog system 10 treats such an input as a pre-closing and initiates a success check by generating an utterance like ""Did you find what you were looking for?". If the user 30 indicates a failure, the dialog system 10 invites the user 30 to try again, for example, "Would you like to try again?" Alternatively, if the user 30 indicates success, the dialog system 10 initiates a closing by generating an utterance such as "Goodbye." If the user 30 says, "goodbye" in this position, the dialog system 10 identifies the utterance as the second pair part of a closing instead of as a pre-closing. Additionally, if they user 30 provides an input again, after the interaction is closed, the dialog system 10 re-engages with a subsequent greeting utterance, such as "Welcome back!"

Figure 6:
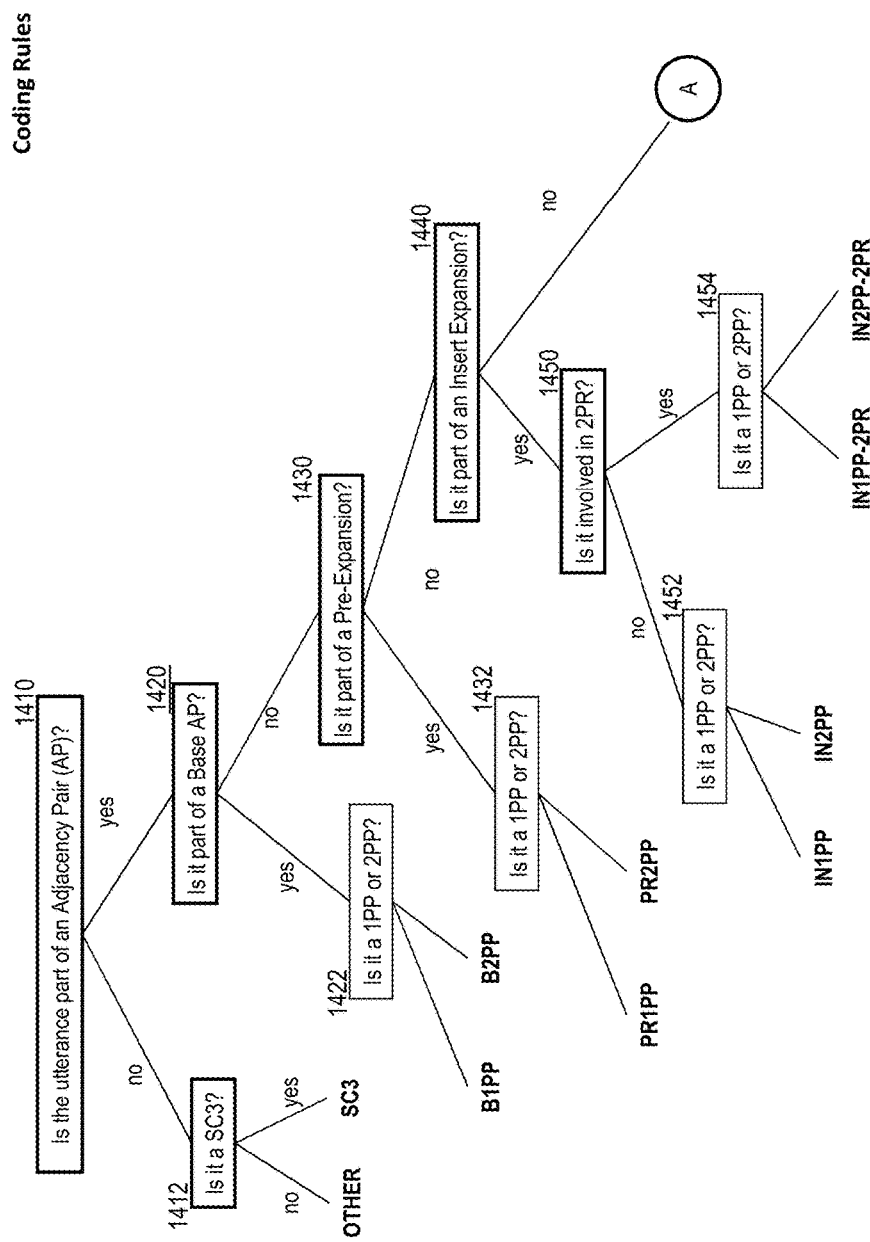
FIG. 6 illustrates a flowchart for identifying an adjacency pair position of the utterance and determining the structural label of the adjacency pair position according to one or more embodiments.

Referring back to FIG. 5, as the dialog system 10 is receiving and generating each utterance, the dialog system 10 identifies an adjacency pair position of the utterance using the adjacency pair model, as shown at block 515. Further, the dialog system 10, based on the predetermined labeling scheme 40, determines a structural label of the adjacency pair position corresponding to each utterance, as shown at block 520. The dialog system 10 stores the labeled utterances, as shown at block 525. FIG. 6 and FIG. 7 illustrate flowcharts for identifying an adjacency pair position of the utterance and determining the structural label of the adjacency pair position. The dialog system 10 may implement the logic of the flowchart, such as by executing computer executable instructions. The dialog system 10 may implement the logic after each utterance is received from the user 30. Additionally, the dialog system 10 implements the logic after each utterance is generated, or upon presenting the generated utterance to the user 30. Further yet, the dialog system 10 may implement the logic on an entire conversation by accessing the utterances of a conversation from a conversation log.

For example, referring to FIG. 6, the dialog system 10 determines if the utterance is part of an adjacency pair, as shown at block 1410. If not, the dialog system 10 determines if the utterance is a sequence closing third, or turn that marks the close of an adjacency pair sequence, as shown at block 1412, and labels the utterance with the corresponding label from the labeling scheme 40. It is to be noted that although the illustrated example uses the labels from the example labeling scheme 40 from FIG. 4, other labels are of course possible. Alternatively, if the utterance is part of an adjacency pair, the dialog system 10 determines if the utterance is part of the base adjacency pair, as shown at block 1420. If so, the dialog system 10 labels the utterance as the first pair-part or the second pair-part of the base pair, as shown at block 1422.

Alternatively, if the utterance is not part of the base adjacency pair, that is the adjacency pair is not a base pair, the dialog system 10 checks if the adjacency pair is a pre-expansion pair, as shown at block 1430. If so, the dialog system 10 labels the utterance as either the first pair-part or the second pair-part of the pre-expansion adjacency pair, as shown at block 1432.

If the dialog system 10 determines that, the adjacency pair is not a pre-expansion adjacency pair, the dialog system determines whether the utterance is part of an insert expansion, as shown at block 1440. If the utterance is part of an insert expansion, the dialog system 10 further determines if the utterance is part of a repair sequence, as shown at block 1450. If the adjacency pair of the utterance is not a repair sequence, the dialog system 10 labels the utterance as either a first pair-part or a second pair-part of the insert expansion, as shown at block 1452. Else, if the insert expansion is a repair sequence, the dialog system 10 labels the utterance as an initiator part (first pair-part) or a repair part (second pair-part) of an insert expansion $2^{nd}$ position repair as shown at block 1454.

Alternatively, if the dialog system 10 determines that, the adjacency pair is not an insertion expansion, the dialog system determines if the utterance is part of a repair sequence, as shown at block 1510. If not, the dialog system 10 labels the utterance as a first pair-part or a second pair-part of a post-expansion adjacency pair, as shown at block 1512. Else, if the utterance is part of a repair sequence, the dialog system 10 checks if the adjacency pair is a $2^{nd}$ position repair, as shown at block 1520. If so, the utterance is labeled as an initiator part (first pair-part) or a repair part (second pair-part) of an insert expansion $2^{nd}$ position repair as shown at block 1522. Else, if the adjacency pair is not a $2^{nd}$ position repair, the dialog system 10 checks if the adjacency pair is part of a $3^{rd}$ position repair sequence, as shown at block 1530. If so, the utterance is labeled as an initiator part (first pair-part) or a repair part (second pair-part) of an insert expansion $3^{rd}$ position repair as shown at block 1532. Else, if the adjacency pair is not a $3^{rd}$ position repair, the dialog system 10 labels the utterance as an initiator part (first pair-part) or a repair part (second pair-part) of an insert expansion $4^{th}$ position repair as shown at block 1534.

FIG. 8 illustrates a result of an example execution of such a labeling method, where each utterance of a conversation between a machine and a user (human) is labeled according to the labeling scheme, which in turn is based on an adjacency pair model, as each utterance in the conversation is either received from the user or is generated and presented to the user. The illustrated result is an example record of labeled utterances 50. As can be deciphered from the illustrated example, the format of the labeled utterances is Speaker~"Utterance"~Dialogue-Act~Adjacency-Pair-Position-Repair-Position, where the position identifies a part of the conversation and the label identifies the position according to the adjacency pair model. In another example, the labeled utterances 50 may not include the position, and instead be stored using a format Utterance~Label (that is, without a position).

The dialog system 10 stores and in an example, transmits such labeled utterances 50 to a statistical trainer or classifier for training a computer system, such as using neural networks, or other techniques to classify parts of a conversation using the adjacency pair model. For example, once the computer system is trained using the labeled utterances 50 generated using the technical solutions described herein, the computer system may be used to label transcripts of other conversations according to the training. In an example, the labeled utterances 50 may be reviewed and corrected before being used for training.

Typically, a dialog designer uses a dialog scripting language (for example, VoiceXML) to encode the conversation 20 between the user 30 and the dialog system 10. While the goals of these scripting language are to help a dialog designer to create an engaging, robust end user interaction, the scripting language do so indirectly because the dialog designer has to ensure that the "script" he/she creates is valid and conforms to the programming model of the dialog system 10. By providing an expandable adjacency-pair (EAP) framework for filling all of the slots in the template, the technical solutions provide both user 30 and the dialog system 10 with resources for managing both situational dependencies and conversational repairs. The EAP content format thus, provides a template to the dialog designer for identifying the multiple pieces that are required for expanded sequences, such as a question-answer sequence. For example, the EAP framework is implemented as a template for any dialog scripting language to facilitate the dialog designer to focus on the "conversation" rather than on the "dialog script" that is used to implement the conversation in a form that can be interpreted by the dialog system 10. Such a process obviates the dialog designer to become an expert in the field of the conversation, and facilitates the dialog system 10 to generate conversations across multiple domains.

In addition, by using the EAP framework, the technical solutions facilitate determining outcome metrics for the conversation 20. For example, if the user 30 responds to a dialog system answer with an Acknowledgment or Appreciation, those can be used as implicit evidence that the user 30 understood the dialog system's 10 answer. However, if the user 30 responds to the system's answer with an Elaboration Request or Definition Request, it indicates that the user 30 has a problem in understanding the response from the dialog system 10. Similarly, a Self-Correction can indicate that the dialog system 10 failed to understand an utterance from the user 30. Tracking such and other types of expansions in the adjacency pair framework facilitate the dialog system 10 to accumulate conversation analytics on user and system troubles in answering or understanding requests and other actions from each other.

For example, using the EAP framework, the technical solutions described herein determines design metrics for measuring the overall successfulness, in terms of mutual understanding of the conversation. The technical solutions described herein further determine an efficiency of the conversation, by measuring the occurrence of AP expansions and outcome success/failure indicators. The technical solutions described herein thus, provide finer-grained metrics than typical metrics used to analyze the dialog system 10. Typically, current metrics tend to measure how often the dialog system 10 successfully matches user utterances to an input/intent, but do not measure the more subtle indicators of whether the user 30 accepted the response from the dialog system 10 or encountered trouble in understanding the response.

In one or more examples, system-user understanding may be measured using two dimensions, adjacency pair expansion, and outcome success/failure. Table 2 illustrates the example four cases for a conversation based on the two dimensions. The conversation is a series of sequences consisting of adjacency pairs. Thus, based on whether the base adjacency pair was expanded, such as using insert pairs, determines whether the adjacency pair sequence is compact or expanded. In one or more examples, the adjacency pair sequence may be considered an expanded sequence if the base pair is expanded with at least a number of insertion pairs. The number of insertion pairs may be locally determined. For example, the predetermined number of insertion pairs, may be 1, 2, 5, 10, or any other positive integer. The technical solutions may further determine if the adjacency pair sequence was a success or failure, based on whether the user 30 obtained and understood the response that he/she was seeking from the dialog system 10.

TABLE 2

| Adjacency Pair Sequence Type | Outcome Success | Outcome Failure |
|---|---|---|
| Compact Sequence | Compact-Success | Compact-Failed |
| Expanded Sequence | Expanded-Success Recovery | Expanded-Failed Unresolved Trouble |

Table 3 illustrates examples of all four cases described herein when the dialog system 10 understands (or misunderstands) the inputs from the user 30. In Table 3, U represents the user 30, and the S represents the dialog system 10.

TABLE 3

| Adjacency Pair Sequence Type | Outcome Success | Outcome Failure |
|---|---|---|
| Compact | U: Where is the loo? S: The restrooms are located behind the elevators on each floor. U: Thanks | U: Where is the loo? S: What do you mean? U: Never mind |
| Expanded | U: Where is the loo? S: What do you mean? U: Where are the lavatories? S: The restrooms are located behind the elevators on each floor. U: Thanks | U: Where is the loo? S: What do you mean? U: Where can I find the loos? S: I'm afraid I still don't understand. U: You're stupid |

Table 4 illustrates examples of all four cases described herein when the user 30 understands (or misunderstands) the outputs from the dialog system 10. In Table 4, U represents the user 30, and the S represents the dialog system 10.

TABLE 4

| Adjacency Pair Sequence Type | Outcome Success | Outcome Failure |
|---|---|---|
| Compact | U: Where is the ATM? S: The ATM is located in the lobby next to the concierge. U: Thanks | U: Where is the ATM? S: The ATM is located in the lobby next to the concierge. U: Never mind |
| Expanded | U: Where is the ATM? S: The ATM is located in the lobby next to the concierge. | U: Where is the ATM? S: The ATM is located in the lobby next to the concierge. |

TABLE 4-continued

| Adjacency Pair Sequence Type | Outcome Success | Outcome Failure |
|---|---|---|
| | U: What does concierge mean? S: The concierge is the person in charge of assisting guests. U: Oh okay | U: What do you mean? S: I'm afraid I don't know how else to put it. U: Never mind |

When generating the utterances for the conversation 20, the dialog system 10 expands the adjacency pair sequence by outputting an insertion first pair-part (IN1PP), as illustrated by the examples in Table 3. The dialog system 10 may output the IN1PP from a predetermined list of types of IN1PP depending on the B1PP input by the user 30. For example, the dialog system 10 may output an IN1PP of type detail request (for example, "inside or outside?"). The dialog system 10 provides the B2PP (response to the original query in B1PP) depending on the response to the IN1PP. The dialog system 10 outputs the detail request in response to the request (B1PP) from the user 30 being ambiguous or incomplete from the perspective of the dialog system 10.

Alternatively or in addition, the dialog system 10 may output an IN1PP of type confirmation (for example, "do you mean X") in case the B1PP is not adequately understood by the dialog system 10. For example, the dialog system 10 fails to recognize an action/intent/B1PP from the user 30 with high confidence but has a guess. Alternatively or in addition, the dialog system 10 outputs an IN1PP of type disambiguation (for example, "do you mean X or Y") in case the dialog system 10 fails to understand the B1PP with high confidence but has two guesses. For example, the dialog system 10 fails to recognize action/intent/B1PP from the user 30. The dialog system 10 may determine whether the B1PP has been understood with a high confidence based on a predetermined threshold confidence value associated with syntactic and semantic analysis of the input (B1PP) from the user 30.

Alternatively or in addition, the dialog system 10 outputs an IN1PP of type specific clarification request (for example, "which place do you mean") in case the dialog system 10 fails to understand part of the action/intent/B1PP from the user 30. Providing the B2PP depends on the response to this IN1PP. Alternatively or in addition, the dialog system 10 outputs an IN1PP of type initial general elaboration request (for example, "what do you mean?" in case the dialog system 10 fails to recognize the action/intent/B1PP from the user 30 with high or medium confidence. Alternatively or in addition, the dialog system 10 outputs an IN1PP of type subsequent general elaboration request (for example, "I'm sorry, I still don't know what you mean") in case the dialog system 10 fails to recognize the paraphrase of the action/intent/B1PP from the user 30 with high or medium confidence. Alternatively or in addition, the dialog system 10 outputs an IN1PP of type system other correction (for example, "isn't that on the first floor?") in case the action/intent/B1PP from user 30 contains an error or wrong assumption, based on the information available to the dialog system 10.

Once the dialog system 10 receives a response (IN2PP) to the IN1PP, the dialog system 10 may provide a response (B2PP) to the original query (B1PP) from the user 30. In case the dialog system 10 requires additional input from the user 30 to provide the response (B2PP), the dialog system 10 may output another IN1PP to request such information from the user 30.

In one or more examples, when conversing with the dialog system 10, the user 30 may expand an adjacency pair sequence by inputting an insertion first pair-part (IN1PP), or a pre-expansion first pair-part (PR1PP), as illustrated by the examples in Table 4. The user 30 may input the IN1PP from a predetermined list of types of IN1PP depending on the B2PP output from the dialog system 10. Alternatively, the user 30 inputs the PR1PP as a capability check (for example, "what can you do?", "do you know about restaurants?"). The response from the dialog system (PR2PP) to the PR1PP facilitates the user 30 to determine capabilities of the dialog system 10 and the user 30 inputs the B1PP accordingly.

Alternatively or in addition, the user 30 inputs an IN1PP of type choices request (for example, "what are my choices?") in case scope of a detail request that the dialog system 10 previously output is unclear/unknown to the user 30. Depending on the response from the dialog system 10, the user 30 provides further information as a response to the detail request from the dialog system 10. Alternatively or in addition, the user inputs an IN1PP of type repeat request (for example, "what did you say?", "say again") in case the B2PP from the dialog system 10 was not adequately heard (or understood) by the user 30. Alternatively or in addition, the user 30 inputs an IN1PP of type partial repeat request (for example "and what street?", "go to the what?") in case a part of the B2PP was not adequately heard (or understood) by the user 30. Alternatively or in addition, the user inputs an IN1PP of type hearing check (for example, "second street?", "Vista Grill?") in case a part of the B2PP might not have been adequately heard (or understood) by the user 30.

Alternatively or in addition, the user 30 inputs an IN1PP of type elaboration request ("what do you mean?") in case the B2PP from the dialog system 10 is not adequately understood by the user 30. Alternatively or in addition, the user 30 inputs an IN1PP of type definition request (for example, "what do you mean by X?") in case part of the B2PP from the dialog system 10 was not adequately understood by the user 30. Alternatively or in addition, the user 30 inputs an IN1PP of type understanding check (for example, "the one downtown") in case part of the B2PP from the dialog system 10 is not adequately understood by the user 30.

Alternatively or in addition, the user 30 inputs an IN1PP of type user self-correction (for example, "no I mean Indian") in case all or part of the B1PP from the user 30 contained an error or wrong assumption by the user 30.

Once the dialog system 10 provides a response (IN2PP) to the IN1PP, the user 30 may provide additional information to facilitate the dialog system to provide the response (B2PP) to the original query (B1PP) from the user 30. In case the user 30 requires additional clarification from the dialog system 10 upon receiving the response (IN2PP), the user 30 may input another IN1PP to request such information from the dialog system 10.

Figure 9:
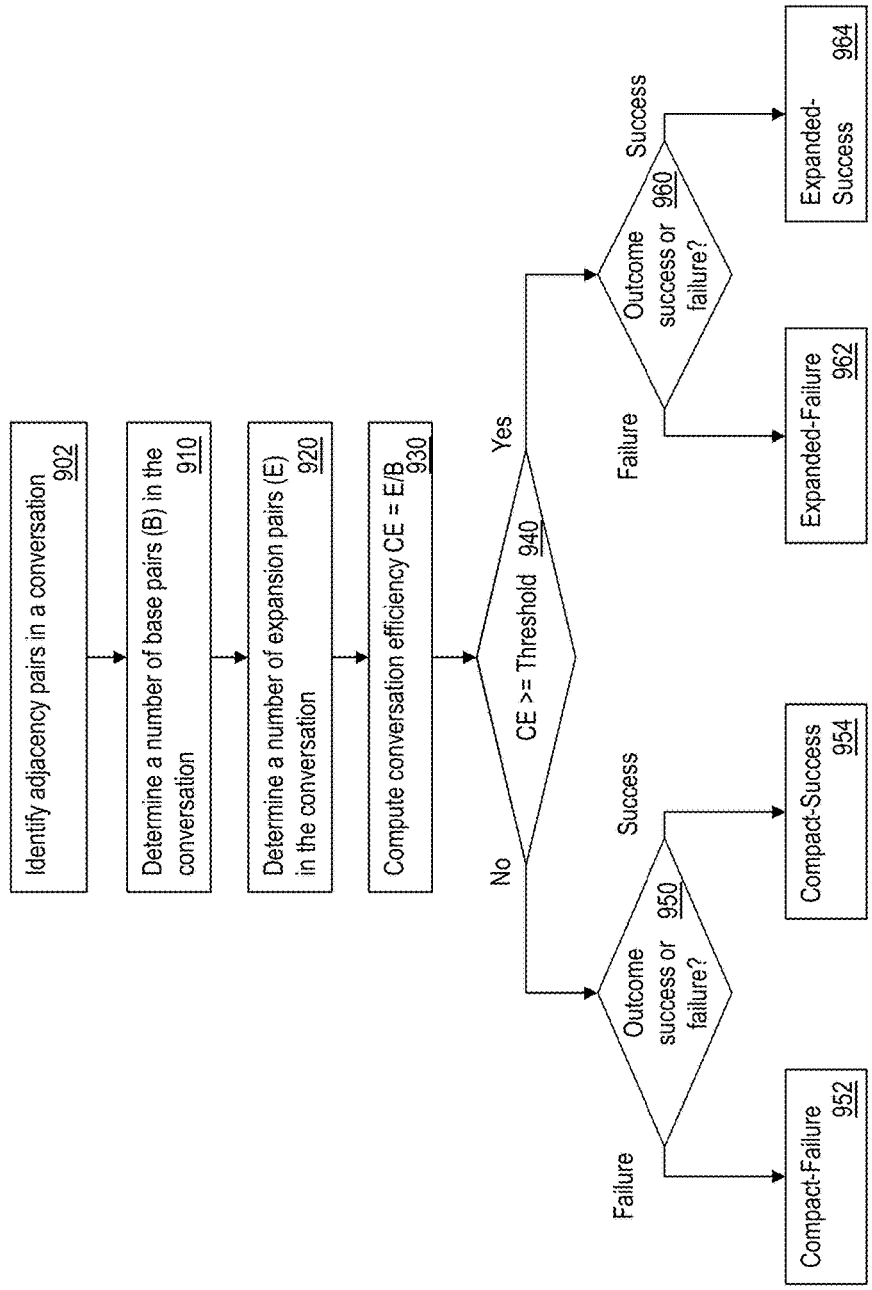
FIG. 9 illustrates a flowchart of an example method to determine a system-user understanding of a conversation according to one or more embodiments.

FIG. 9 illustrates a flowchart of an example method to determine the system-user understanding of the conversation 20 and to categorize the conversation 20 according to the dimensions illustrated in the tables herein. In one or more examples, the dialog system 10 measures the system-user understanding of the conversation 20. Alternatively or in addition, a separate conversation analysis system may measure the system-user understanding. The examples herein use the dialog system 10 to analyze the conversation 20, however, it is understood that the analysis may be implemented by the separate conversation analysis system. The system-user understanding may be determined at run-time, such as after each utterance is generated/received.

Alternatively or in addition, the system-user understanding may be determined after the conversation 20 is completed by accessing a log of the conversation 20.

The dialog system 10 identifies the adjacency pairs in the conversation 20, as shown at block 902. The dialog system 10 identifies the adjacency pairs using technical solutions described herein. The dialog system 10 further determines a number of base pairs (B) in the conversation 20, as shown at block 910. The dialog system 10 further determines a number of expansion pairs (E) in the conversation 20, as shown at block 920. The dialog system 10 may determine the counts of the adjacency pair based on the labeling as described throughout the present document. The dialog system 10 further computes a conversation efficiency CE=E/B, as shown at block 930. In one or more examples, the conversation efficiency is measured as a ratio of adjacency-pair expansions and the total number of base adjacency pairs in the conversation.

The dialog system 10 compares the conversation efficiency with a predetermined threshold, as shown at block 940. In case the conversation efficiency is greater than (or is equal to) the predetermined threshold, the conversation 20 is determined as an expanded conversation. Else, if the conversation efficiency is lesser than the predetermined threshold, the conversation 20 is determined to be a compact conversation. In one or more examples, the efficiency may be broken down into 3 efficiency measures based on rate of dependencies, hearing repairs, and understanding repairs.

It is to be noted that inefficiency does not mean that the user 30 did not get the desired information from the dialog system, rather that the conversation expanded beyond a predetermined number of adjacency pairs. For example, the conversation 20 may include an expanded adjacency pair, but end with a success indicator. The dialog system 10 detects if the conversation ends with an outcome success indicator or an outcome failure indicator, as shown at blocks 950 and 960.

To determine the indicator, the dialog system 10 analyzes the final utterance in the conversation 20. For example, the final utterance being a base second pair-part (for example, "the gym is on the 2nd floor") is indicative that the B1PP was recognized as a known action/intent, and accordingly an outcome success indicator. Alternatively or in addition, the final utterance being an acknowledgment (for example, "okay", "all right") from the user 30 is indicative that the B2PP from the dialog system was accepted, understood, and accordingly an outcome success indicator. Alternatively or in addition, the final utterance being an appreciation (for example, "thank you", "great", "thanks") is indicative that the B2PP was accepted by the user 30, and thus an outcome success indicator. Alternatively or in addition, the final utterance being an independent B1PP from the user 30 is indicative that the user 30 is moving on to next request/question (not back to repair previous), and thus an outcome success indicator.

The dialog system 10 may also identify outcome failure indicator by analyzing the final utterance of the conversation 20. For example, the final utterance being a self-correction (for example, "no", "I mean the coffee place") is indicative that the B2PP was inadequate, and thus an outcome failure indicator. Alternatively or in addition, the final utterance being an abort turn (for example, "never mind", "forget it") is indicative that the B2PP was inadequate, and thus an outcome failure indicator. Alternatively or in addition, the final utterance being an abort conversation (for example, "I want to speak to a real person") is indicative that the B2PP was inadequate, and thus an outcome failure indicator.

Alternatively or in addition, the final utterance being an insult (for example, "you're stupid") is indicative that the system's previous response(s) are inappropriate, and thus an outcome failure indicator. Alternatively or in addition, the final utterance being a non-response is indicative that the user 30 abandons the conversation 20, and thus an outcome failure indicator.

Based on the conversation efficiency and the outcome indicator, the dialog system 10 determines if the conversation 20 is one of a compact-success, a compact-failure, an expanded-success, or an expanded-failure, as shown at blocks 952, 954, 962, and 964.

Figure 10:
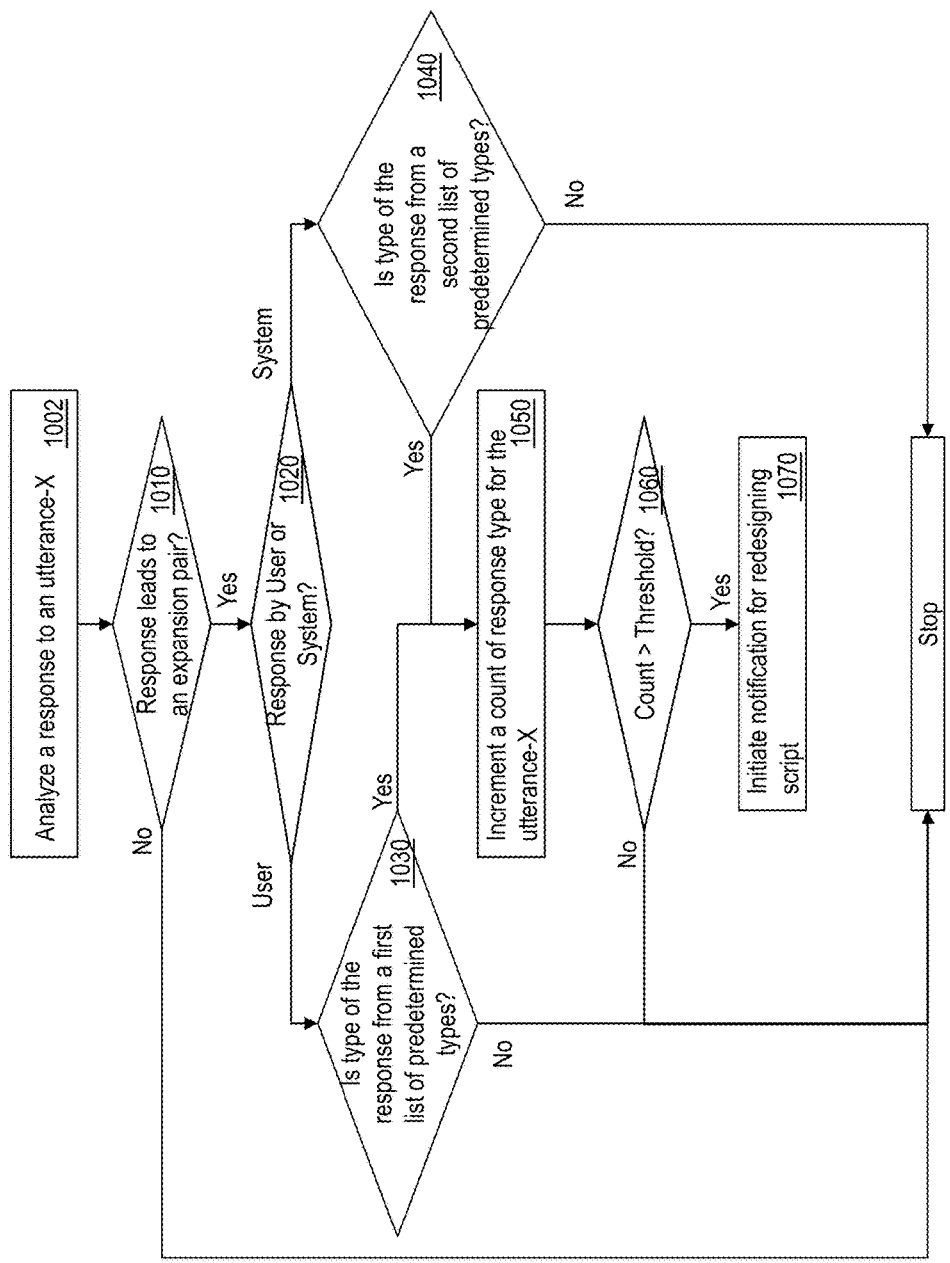
FIG. 10 illustrates a flowchart of an example method for detecting if a particular adjacency pair sequence has one or more expansions consistently across multiple users according to one or more embodiments.

FIG. 10 illustrates a flowchart of an example method for the dialog system 10 (or the conversation analysis system) to detect if a particular adjacency pair sequence has one or more expansions consistently across multiple users, and notifies the dialog designer to examine it for poorly worded responses by the dialog system 10. The dialog system 10 analyzes a response to an utterance-X, as shown at block 1002. The response is another utterance. The dialog system 10 determines if the response causes the adjacency pair sequence to be expanded, as shown at block 1010. If the adjacency pair sequence does get expanded, the dialog system 10 determines if the response is from the user 30 or from the dialog system 10, as shown at block 1020.

If the response is from the user 30, the dialog system 10 determines if the response is of a type from a first list of predetermined types, as shown at block 1030. For example, the first list of predetermined types expands the adjacency pair sequence to include dependencies, hearing repairs, and understanding repairs. For example, the first list of predetermined types may include definition request, repeat request, partial repeat request, and elaboration request.

Alternatively, if the response is from the dialog system 10, the dialog system determines if the response is an utterance of a second predetermined type, as shown at block 1040. The second list of predetermined types also expands the adjacency pair sequence to include dependencies, hearing repairs, and understanding repairs. For example, the second list of predetermined types may include specific clarification request, and disambiguation.

If the response is of any of the predetermined types, a counter associated with the utterance-X is incremented, as shown at block 1050. The counter is indicative of a number of times the utterance-X has caused the response that expanded the adjacency pair sequence. The counter is persisted across multiple users, to facilitate the dialog system 10 to identify that the utterance-X causes the expansion across multiple users. The dialog system 10 compares the counter with a predetermined threshold, as shown at block 1060. In case the counter is above the predetermined threshold, the dialog system 10 concludes that the utterance-X is causing the conversation 20 be unusually expanded, and accordingly initiates a notification for redesigning the utterance-X, as shown at block 1070. In one or more examples, the dialog system 10 may electronically send the notification to the dialog designer, such as via email, text message, instant message, or any other form.

As an example scenario, consider that the dialog system 10 detects that the utterance-X (B2PP) from the dialog system 10, "your diabetes screening is 100% covered if performed by an in-network provider," gets consistently expanded by users with an IN1PP of the type definition requests like "what do you mean by in-network?" The dialog system 10 (or the conversation analysis system) notifies the dialog designer to incorporate the definition of that term ('in-network') into the B2PP response from the dialog system 10, or to explain that term upfront. It is understood that above is just one example, and that other examples are possible. Other AP expansions, that are initiated using a different type of IN1PP from the user 30, for example dependencies, may not require to be redesigned. For example, the choices request, "What are my choices?" in response to the detail request from the dialog system 10 may be unavoidable whenever the set of possible answers is large, like with movie genres or food cuisines. In other words, the dialog designer cannot include all choices in the question upfront. Accordingly, the dialog system 10 notifies the dialog designer to redesign the conversation 20 depending on the type of the IN1PP from the user 30.

The technical solutions described herein, thus, facilitate the dialog designer, to receive automatic notifications to redesign inefficient portions of the conversation. Thus, the technical solutions facilitate improving the dialog system 10 that generates the natural language conversation.

Figure 11:
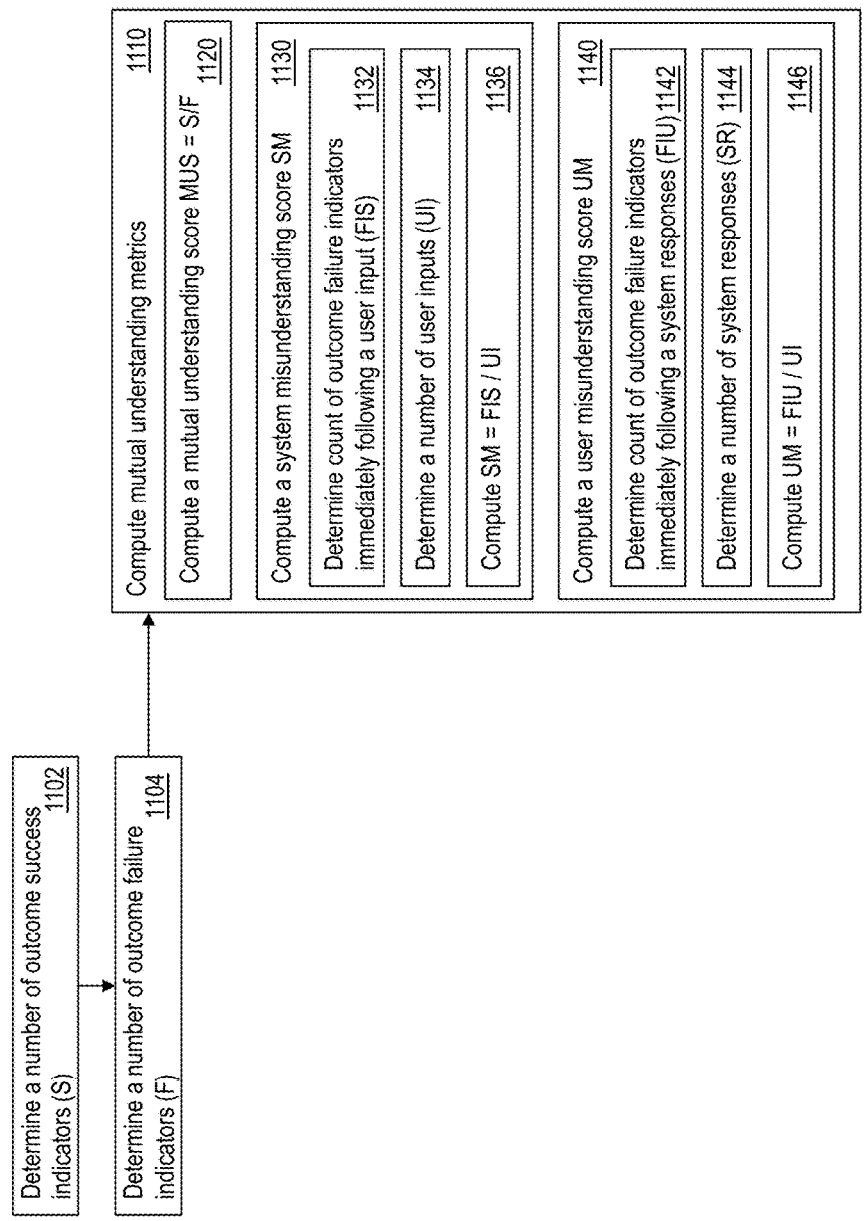
FIG. 11 illustrates a flowchart of an example method to compute a qualitative score for a dialog system according to one or more embodiments.

The technical solutions described herein facilitate computing additional metrics of a mutual understanding of the conversation 20. The additional metrics facilitate further improvements to the dialog system 10, particularly the script of the conversation. FIG. 11 illustrates a flowchart of an example method to compute a qualitative score for the dialog system 10. The dialog system 10 or the conversation analysis system may implement the method.

The dialog system 10 determines a number of outcome success indicators (S), and a number of outcome failure indicators (F), as shown at blocks 1102 and 1104. The dialog system 10 determines the numbers based on a conversation log. The dialog system 10 further computes mutual understanding metrics based on the conversation log, as shown at block 1110. The dialog system 10 further computes a mutual understanding score (MUS) based on the numbers of the outcome success indicators and the outcome failure indicators, as shown at block 1120. In one or more examples, MUS=S/F, where higher the MUS, the greater the level of mutual understanding. In one or more examples, the dialog system 10 further computes a system misunderstanding score (SM) and user misunderstanding score (UM), as shown at blocks 1130 and 1140. The scores described herein may be computed for a particular base pair and/or for a whole conversation (series of base pairs).

For example, for computing SM, the dialog system 10 identifies outcome failure indicators that immediately follow requests or questions (that is B1PPs) from the user 30, as shown at block 1132. The dialog system 10 keeps track of a number of such outcome failure indicators (FIS). Such outcome failure indicators represent the dialog system 10 misunderstanding inputs from the user 30. The dialog system 10 further determines a total number of user inputs (UI), as shown at block 1134. The dialog system 10 further computes a relative measure of the level of system understanding based on a ratio of the number of failure indicators FI and the total number of user inputs UI. For example, SM=FIS/UI, as shown at block 1136.

Further, for computing UM, the dialog system identifies outcome failure indicators that immediately follow responses or answers from the dialog system 10 (that is, B2PPs), as shown at block 1142. The dialog system 10 keeps track of a number of such outcome failure indicators (FIU). Such outcome failure indicators represent user misunderstanding of system outputs. The dialog system 10 further determines a total number of system responses (SR), as shown at block 1144. The dialog system 10 further computes a relative measure of the level of user understanding based on a ratio of the outcome failure indicators FIU to the total number of system answers SR. For example, UM=FIU/SR, as shown at block 1146. The ratio may be computed for a particular base pair and/or for a whole conversation (series of base pairs).

In one or more examples, the dialog system 10 compares the misunderstanding metrics with corresponding predetermined thresholds. In response to the metrics surpassing the corresponding predetermined thresholds, the dialog system 10 generates and sends a notification for the dialog designer to redesign the script of the conversation. The technical solutions, thus, facilitate improvement of the machine that generates the natural language conversation.

Further, as noted earlier, in one or more examples, the dialog system 10 determines the metrics associated with the dialog system 10 as described herein. Alternatively or in addition, a separate conversation analysis system determines the metrics associated with the dialog system 10. In one or more examples, the conversation analysis system may include the components as illustrated in FIG. 2. For example, the conversation analysis system may be a server computer, a desktop computer, a laptop computer, a tablet computer, a smartphone, or any other such apparatus. The conversation analysis system may compute the metrics dynamically, after each utterance is received/generated by the dialog system 10. Alternatively or in addition, the conversation analysis system computes the metrics after the conversation has concluded, for example by accessing a conversation log of the dialog system 10.

Accordingly, the technical solutions described herein, provide, analyze, and further improve generic conversation templates for different use cases so that the development of a machine that generates natural language conversation is more streamlined. The templates can be modified at a higher abstraction level by the designer, and once customized, translated into the underlying scripting language. The templates provided by the technical solutions can thus be used as higher level languages that provide intuitive hierarchical representations, which allows the machine to be built without having detailed knowledge of the domain space, or the underlying scripting language. The technical solutions facilitate generating the natural language conversation using an expandable adjacency-pair model of natural conversation. The technical solutions, using the model, facilitates creating dialogue interfaces that handle natural "recipient design," or local personalization based on dependencies, which are based on knowledge of the user, and on the troubles in hearing and understanding that a particular user exhibits in a particular instance. Without this kind of interaction model, a dialog system may interpret natural language inputs and produce natural language outputs, but may not be able to recognize and respond appropriately to common adjacency pair expansions such as repeat requests, clarification requests, definition requests, confirmation requests, hearing checks, understanding checks, preliminary inquiries, choices requests, 3rd turn self-corrections, acknowledgements, appreciations and more. In the technical solutions described herein, such generic conversational actions occur as adjacency pair expansions, in predictable positions and together make up components of "conversational competence," thus improving natural language conversation generation.

Further, the technical solutions described herein compute metrics for analyzing the conversation and the dialog system that generates utterances of the conversation according to the expandable adjacency pair framework. Based on the computed metrics, the technical solutions further identify particular portions of the conversation script to be redesigned for improving efficiency of the conversation and thus the dialog system. Accordingly, the technical solutions facilitate improving a dialog system, which is a machine that generates natural language conversation. Thus, the technical solutions described herein facilitate improving computing technology.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer implemented method for analyzing a natural language conversation-generating machine, the method comprising:
   determining, from a plurality of adjacency pairs in a conversation, a number of base pairs;
   determining, from the plurality of adjacency pairs, a number of expansion pairs;
   computing a efficiency score for the conversation by computing a ratio of the number of base pairs and the number of expansion pairs;
   identifying, from the conversation, a specific utterance of an adjacency pair wherein the adjacency pair is associated with an expansion pair, the utterance being a message that is played back by the machine in response to a statement by a user;
   incrementing a counter corresponding to the utterance; and
   in response to the counter crossing a predetermined threshold, sending a message to notify a developer to redesign the specific utterance.

2. The computer implemented method of claim 1, further comprising:
   determining a type of outcome of the conversation; and
   determining an outcome-efficiency type of the conversation based on the efficiency score and the type of the outcome.

3. The computer implemented method of claim 2, wherein the outcome-efficiency type is determined from a predetermined group of outcome-efficiency types consisting of compact-failure, compact-success, expanded-failure, and expanded-success.

4. The computer implemented method of claim 2, wherein the type of the outcome is determined based on an outcome indicator of a base pair of the conversation, wherein the outcome indicator is identified based on a second pair-part of the base pair being one of a predetermined set of response types.

5. The computer implemented method of claim 1, wherein the message is initiated further in response to the adjacency pair being expanded using a specific response type.

6. The computer implemented method of claim 5, wherein the specific response type is one from a group of response types consisting of a definition request, a repeat request, a partial repeat request, and an elaboration request.

7. A system for analyzing a natural language conversation-generating machine, the system comprising:
   a memory; and
   a processor coupled with the memory, the processor being configured to:
   determine, from a plurality of adjacency pairs in a conversation, a number of base pairs;
   determine, from the plurality of adjacency pairs, a number of expansion pairs;
   compute a efficiency score for the conversation by computing a ratio of the number of base pairs and the number of expansion pairs;
   identify, from the conversation, a specific utterance of an adjacency pair wherein the adjacency pair is associated with an expansion pair, the utterance being a message that is played back by the machine in response to a statement by a user;
   increment a counter corresponding to the utterance; and
   in response to the counter crossing a predetermined threshold, send a message to notify a developer to redesign the specific utterance.

8. The system of claim 7, wherein the processor is further configured to:
   determine a type of outcome of the conversation; and
   determine an outcome-efficiency type of the conversation based on the efficiency score and the type of the outcome.

9. The system of claim 8, wherein the outcome-efficiency type is determined from a predetermined group of outcome-efficiency types consisting of compact-failure, compact-success, expanded-failure, and expanded-success.

10. The system of claim 8, wherein the type of the outcome is determined based on an outcome indicator of a base pair of the conversation, wherein the outcome indicator is identified based on a second pair-part of the base pair being one of a predetermined set of response types.

11. The system of claim 7, wherein the message is initiated further in response to the adjacency pair being expanded using a specific response type.

12. The system of claim 11, wherein the specific response type is one from a group of response types consisting of a definition request, a repeat request, a partial repeat request, and an elaboration request.

13. A computer program product for analyzing a natural language conversation-generating machine, the computer program product comprising a computer readable storage medium, the computer readable storage medium comprising computer executable instructions, wherein the computer readable storage medium comprises instructions to:
- determine, from a plurality of adjacency pairs in a conversation, a number of base pairs;
- determine, from the plurality of adjacency pairs, a number of expansion pairs;
- compute a efficiency score for the conversation by computing a ratio of the number of base pairs and the number of expansion pairs;
- identify, from the conversation, a specific utterance of an adjacency pair wherein the adjacency pair is associated with an expansion pair, the utterance being a message that is played back by the machine in response to a statement by a user;
- increment a counter corresponding to the utterance; and
- in response to the counter crossing a predetermined threshold, send a message to notify a developer to redesign the specific utterance.

14. The computer program product of claim 13, wherein the computer readable storage medium further comprises instructions to:
- determine a type of outcome of the conversation; and
- determine an outcome-efficiency type of the conversation based on the efficiency score and the type of the outcome.

15. The computer program product of claim 14, wherein the outcome-efficiency type is determined from a predetermined group of outcome-efficiency types consisting of compact-failure, compact-success, expanded-failure, and expanded-success.

16. The computer program product of claim 14, wherein the type of the outcome is determined based on an outcome indicator of a base pair of the conversation, wherein the outcome indicator is identified based on a second pair-part of the base pair being one of a predetermined set of response types.

17. The computer program product of claim 13, wherein the message is initiated further in response to the adjacency pair being expanded using a specific response type, and wherein the specific response type is one from a group of response types consisting of a definition request, a repeat request, a partial repeat request, and an elaboration request.

* * * * *